(12) United States Patent
Chandra et al.

(10) Patent No.: US 9,104,389 B2
(45) Date of Patent: Aug. 11, 2015

(54) HIERARCHICAL FUNCTIONAL AND VARIABLE COMPOSITION DIAGRAMMING OF A PROGRAMMING CLASS

(75) Inventors: Vikas Chandra, Bangalore (IN); Sarika Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 13/276,085

(22) Filed: Oct. 18, 2011

(65) Prior Publication Data

US 2013/0097582 A1 Apr. 18, 2013

(51) Int. Cl.
*G06F 9/44* (2006.01)

(52) U.S. Cl.
CPC ........................................ *G06F 8/24* (2013.01)

(58) Field of Classification Search
None
See application file for complete search history.

(56) References Cited

U.S. PATENT DOCUMENTS

| | | | |
|---|---|---|---|
| 5,651,101 A | 7/1997 | Gotoh et al. | |
| 5,699,310 A * | 12/1997 | Garloff et al. | 717/108 |
| 5,802,334 A * | 9/1998 | Nickolas et al. | 715/854 |
| 6,269,475 B1 * | 7/2001 | Farrell et al. | 717/113 |
| 6,415,435 B1 | 7/2002 | McIntyre | |
| 6,480,856 B1 | 11/2002 | McDonald et al. | |
| 6,928,453 B2 * | 8/2005 | Roddy | 707/999.103 |
| 6,993,759 B2 * | 1/2006 | Aptus et al. | 717/170 |
| 7,051,316 B2 * | 5/2006 | Charisius et al. | 717/103 |
| 7,370,315 B1 * | 5/2008 | Lovell et al. | 717/105 |
| 7,779,384 B2 | 8/2010 | Lin et al. | |
| 7,814,427 B2 | 10/2010 | Cook et al. | |
| 7,934,192 B2 | 4/2011 | Shaw | |
| 8,065,655 B1 | 11/2011 | Deo et al. | |
| 2002/0116702 A1 * | 8/2002 | Aptus et al. | 717/170 |
| 2002/0188514 A1 | 12/2002 | Kritt et al. | |
| 2004/0098406 A1 * | 5/2004 | Roddy | 707/103 R |
| 2004/0117765 A1 | 6/2004 | Chan | |
| 2005/0278362 A1 | 12/2005 | Maren et al. | |
| 2006/0036656 A1 | 2/2006 | Mercer | |

(Continued)

FOREIGN PATENT DOCUMENTS

| | | |
|---|---|---|
| WO | 2008096632 A1 | 8/2008 |
| WO | WO 2008/096632 A1 | 8/2008 |

OTHER PUBLICATIONS

Chao, Liu, et al., "Reversed Automatic Generation of Visualized Class Diagram of Object-Oriented Program," Journal of Beijing University of Aeronautics and Astronautics, 24(4):411-14 (1/6-6/6) (Aug. 1998).

(Continued)

*Primary Examiner* — Don Wong
*Assistant Examiner* — Erika Kretzmer
(74) *Attorney, Agent, or Firm* — Holland & Knight LLP; Brian J. Colandreo, Esq.; Jeffrey T. Placker, Esq.

(57) ABSTRACT

Inheritance contributions of programming class functions and class variables are diagrammed. A functional diagram illustrates individual class contributions of functions. A variable composition diagram illustrates individual class contributions of variables. A diagrammatic depiction of functions overridden and functions contributed in the inheritance hierarchy is provided. Functions which are unique, overridden and/or have contributions in different classes of the hierarchy are visually distinguished (e.g., by distinguishing marks). Classes in the hierarchy are graphically depicted with relative sizes based on percent contribution.

16 Claims, 6 Drawing Sheets

(56) References Cited

U.S. PATENT DOCUMENTS

| | | |
|---|---|---|
| 2006/0106762 A1 | 5/2006 | Caracas et al. |
| 2006/0150169 A1 | 7/2006 | Cook et al. |
| 2008/0092109 A1 | 4/2008 | Kinnucan, Jr. et al. |
| 2008/0275919 A1 | 11/2008 | Murthy et al. |
| 2009/0132996 A1 | 5/2009 | Eldridge et al. |
| 2009/0157711 A1 | 6/2009 | Baer et al. |
| 2009/0222473 A1 | 9/2009 | Chowdhury |
| 2009/0235229 A1 | 9/2009 | Dangeville et al. |
| 2010/0023922 A1 | 1/2010 | Limburn et al. |
| 2010/0037203 A1 | 2/2010 | Limburn |
| 2010/0070949 A1* | 3/2010 | Rama et al. .......... 717/125 |
| 2010/0185683 A1 | 7/2010 | Baby et al. |
| 2010/0198612 A1 | 8/2010 | Streepy, Jr. |
| 2010/0222902 A1 | 9/2010 | Eldridge et al. |
| 2011/0029951 A1* | 2/2011 | Jansen et al. .......... 717/113 |
| 2011/0138361 A1 | 6/2011 | McEntee et al. |
| 2012/0005644 A1 | 1/2012 | Limburn et al. |
| 2012/0102543 A1 | 4/2012 | Kohli et al. |
| 2013/0097582 A1 | 4/2013 | Chandra et al. |
| 2014/0075004 A1 | 3/2014 | Van Dusen et al. |
| 2014/0137081 A1 | 5/2014 | Kohli et al. |

OTHER PUBLICATIONS

Capretz, L.F., "Object-Oriented Design Methodologies for Software Systems," Ph. D. Thesis, Newcastle upon Tyne, British Lending Library DSC stock location No. DX172632, 1 page (Abstract Only) 1991.

Capretz, L.F. "Object-Oriented Design Methodologies for Software Systems," Ph.D. Thesis, Newcastle Upon Tyne, British Lending Library DSC Stock Location No. DX172632, 1 pg, Abstract.

Liu Chao et al., "Reversed Automatic Generation of Visualized Class Diagram of Object-Oriented Program" Journal of Beijing University of Aeronautics and Astronautics, vol. 24, No. 4, pp. 411-414, Abstract Only, Aug. 1998, Only English translation of Abstract.

Wang, X.B. et al. "Automatic Hierarchical Layout Algorithm for UML Class Diagram," Journal of Software, vol. 20, No. 6, Jun. 2009, pp. 1487-1498; Inst. of Software, the Chinese Academy of Sciences, Retrieved from the Interntet <http://pub.chinasciencejournal.com/article/getarticle.action?articleId=7530> Only English translation of Abstract.

Krishan, H. et al., "Relative Extraction Methodology for Class Diagram Generation Using Dependency Graph," (online) 2010 IEEE Int'l Conf. on Communication Control and Computing Technologies (ICCCCTt), Oct. 7-9, 2010, pp. 815-820, retrieved from the internet: <http://ieeeexplore,ieee.org/stamp/stamp.jsp?arnumber=5670730>.

Patwardhan, A.A. et al. "Security-Aware Program Visualization for Analyzing In-Lined Reference Monitors," Master's Thesis, University of Texas at Dallas, Jun. 2010, 71 pgs.

\* cited by examiner

HIERARCHICAL FUNCTIONAL AND VARIABLE COMPOSITION DIAGRAMMING OF A PROGRAMMING CLASS

BACKGROUND

The present invention relates to diagramming or depicting object oriented programming class, and more specifically, to diagramming and depicting inheritance contributions and overrides of such classes.

Object-Oriented Programming (OOP) is a programming paradigm using "objects" to design software. These "objects" are data structures consisting of data fields and methods together with their interactions. One of the most important features of an object oriented language is inheritance. Inheritance is the concept of when a class of objects is defined, any subclass that is defined can inherent the definitions of the one or more general classes. This helps in code reuse and better compartmentalization of code and also in better designing and organizing of code.

Programming in the object oriented language is fine if the inheritance hierarchy tree is a small one but once the inheritance tree has more than three levels, it becomes difficult to understand the contributions by the different classes in the hierarchy. Many times a single functionality has its code split across different layers of inheritance (inheriting ancestor functionality and adding class specific implementation). Many times the subclass totally overrides the functionality by its ancestors (rightly so-needed in certain scenarios). It becomes increasingly difficult to identify the value of a class and its ancestors. The advantage introduced by the class in terms of functionality and variables blurs the understanding of functional (a function's) contribution by different levels in the hierarchy. This makes it difficult for software engineers and programmers to understand and debug code.

The current set of utilities includes a hierarchy view in Eclipse which shows the different ancestors of a particular class and the functions that a present class has. But here one needs to open all the classes in the hierarchy and see the corresponding hierarchy view to understand. There is also a way to open the view of a list of all the methods in the hierarchy but it is very confusing and does not help to understand the inheritance structure. Showing the implementation of the function shows all the classes in the hierarchy which overrides or contributes to it. There is another tool where the inherited methods are depicted lighter.

The current set of solutions does not identify the contribution made by the current class and the ancestor classes in the context of the hierarchy.

BRIEF SUMMARY

Applicants address the foregoing problems and shortcomings of the prior art. In particular, to solve the above problems, Applicants provide a hierarchical functional and variable composition diagram for programming classes (i.e., object oriented programming classes). Embodiments provide a diagrammatic depiction of overrides of methods and/or depiction of methods contributed in the inheritance hierarchy (object class and ancestor classes).

The core idea of the present invention is to have a hierarchical functional and variable composition diagram for a class (formed of diagrammatic depictions of methods overridden and/or contributed in the hierarchy) such that all contributing classes are shown from the context of the hierarchy. Individual class contributions are shown for all the functions and variables of a subject class. So for any class, there are effectively two diagrams, namely a hierarchical class function diagram and a variable composition (composition of each variable) diagram.

A hierarchical class function diagram for class A illustrates/shows the functionality contributions for all the ancestor classes in the hierarchy of class A (with respect to class A—meaning, if an object of A is there then display which functions are contributed from which of the ancestor classes). The total number of functions contributed per class in the ancestry of the hierarchy is indicated and the percent of functionality contributed by that ancestry class to the total functionality available for class A is indicated.

Similarly, the variable composition diagram for class A shows the name and number (count and relative percentage) of variables contributed by each ancestry class in the hierarchy.

The graphically illustrated height (hierarchy band or area dimensions) of each class in the class function and variable composition diagrams depends on and is directly proportional to the percentage contribution.

When the indicated number of functions is selected (clicked on) by a user for any ancestor class, the hierarchical class function diagram responsively shows indications or names of all the functions contributed by that ancestor class. A new function in the given class, i.e., class A, that is not in the ancestry hierarchy is not user selectable (clickable) in embodiments. The functions which are overridden or which have contributions in different ancestor classes in the hierarchy are marked differently to be visually distinguishable in the diagram and are user selectable (clickable).

Once a displayed indication, for example, name of the function is clicked (selected by a user), the hierarchical class function diagram may responsively show the following:

a. indications (names) of all the classes which contribute that function are depicted by showing a set of links to each other, b. functions overridden are depicted by ellipse border around or a crossing out of names of or other visual treatment of the overridden functions in the hierarchy, and c. there can be a combination of (a) and (b) in the same hierarchy (where a function contributes to its ancestor class and that function overrides any one of its ancestor's functions).

According to one embodiment of the present invention a computer based method, system, apparatus and/or computer program product of designing software comprises:

a diagramming engine (as executed by a digital process) receiving user election of a programming object of a program model displayable in a screen view of a software engineering system;

the diagramming engine determining corresponding class of the user elected programming object and determining a class hierarchy, the class hierarchy including the corresponding class and any ancestor classes, wherein the corresponding class and each ancestor class is formed of respective functions and variables;

the diagramming engine generating a diagram depicting the functions as contributed by respective ones of the corresponding class and ancestor classes, such that the diagram illustrates class inheritance of the user elected programming object by depicting which classes in the hierarchy contribute which functions, the generated diagram including (i) quantitative indications of function-wise contribution (i.e., with respect to functions or functional contribution) made by each class and (ii) visual indications distinguishing functions which are unique, overridden or contribute in different classes of the hierarchy; and displaying the generated diagram to a user on output. The displayed diagram having a diagram interface (user-interactive or GUI).

In embodiments, the quantitative indications include a number count of functions contributed by a class. The quantitative indications may further include relative percent of total function contribution.

In embodiments, the computer system/method further generate a variable composition diagram depicting the variables as contributed by respective ones of the corresponding class and ancestor classes. The variable composition diagram may include quantitative indications of variable-wise (per variable) contributions made by each class. For instance, the quantitative indications include a number count of variables contributed by a class, and/or the quantitative indications include a relative percentage of total variable contribution.

The diagram interface enables user interaction with the depicted functions, and responsively renders indication of all classes that contribute that function.

In embodiments, the visual indications of the generated diagram visually distinguish between overridden functions and newly added functions. For instance, the visual indications of overridden or newly added functions include geometric borders, color schemes or other distinguishing visual effects.

Accordingly, embodiments identify contribution made by one or more classes in the object oriented program (for example a current class and ancestor classes) in the context of the hierarchy by creating a hierarchical functional diagram and a variable composition diagram for each class. The diagrams provide diagrammatic depiction of methods (functions) overridden and/or contributed in the hierarchy. And the diagrams provide visual indications distinguishing functions which are unique, overridden or which have contributions in different classes in the hierarchy. These functions are marked differently in the diagrams to graphically distinguish them in the diagrams. The percentage contribution of each class (by method/function and by variable) is calculated for the hierarchy and displayed in the diagrams.

BRIEF DESCRIPTION OF THE SEVERAL VIEWS OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 2:
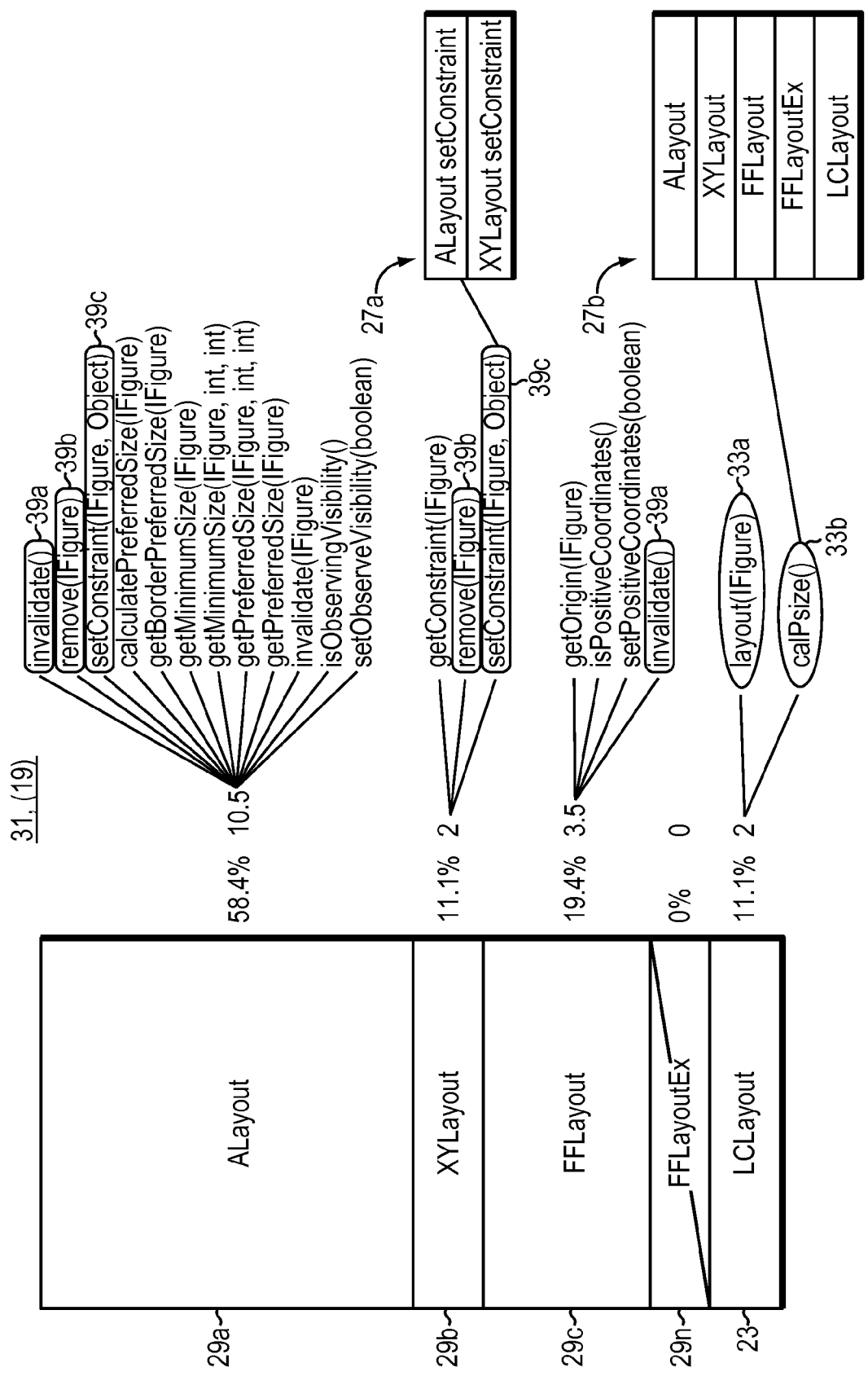
Figure 3:
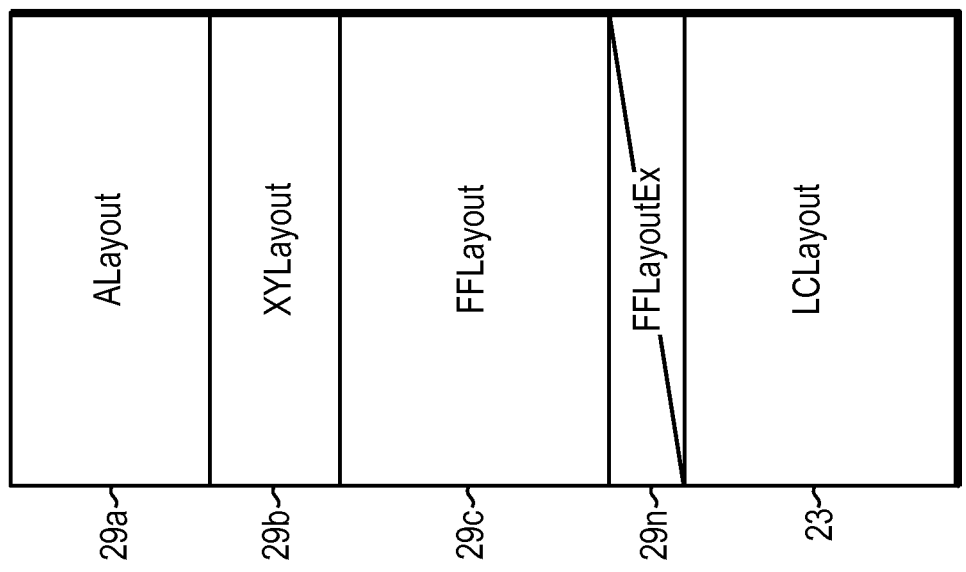
FIG. 3 is a schematic illustration of a variable composition diagram of embodiments of the present invention.

Embodiments of the present invention diagrammatically identify the ancestor classes 29 and attribute information emanating from different classes in an object oriented programming class hierarchy. For a subject object-oriented class 23, two diagrams are formed, namely a hierarchical class function diagram 31 (FIGS. 1 and 2) and a variable composition diagram 41 (FIG. 3). The hierarchical class function diagram 31 (or also referred to as functional diagram 31) illustrates the functions 39 (generally) contributed by the ancestor classes 29 in the hierarchy. The functional diagram 31 indicates the total number of functions contributed per ancestor class 29 and the relative percent of functions contributed per ancestor class 29 with respect to the total number of functions 33, 39 available. The variable composition diagram 41 illustrates the variables (from various functions) contributed by each ancestor class 29.

In a preferred embodiment, a diagramming engine 21 determines whether a subject function is a contributor function, an overridden function or a new function. Based on this determination, diagramming engine 21 generates functional diagram 31 and variable composition diagram 41. Among other advantages, the variable composition diagram 41 helps in better software program design and better verification of a function correctly being implemented/contributed (identifying non-contributing classes) across the hierarchy. Seeing the variable composition diagram 41 of different classes 23, 29 in the hierarchy also helps software engineers and program developers in understanding the classes 23, 29 in the context of the hierarchy.

Figure 1:
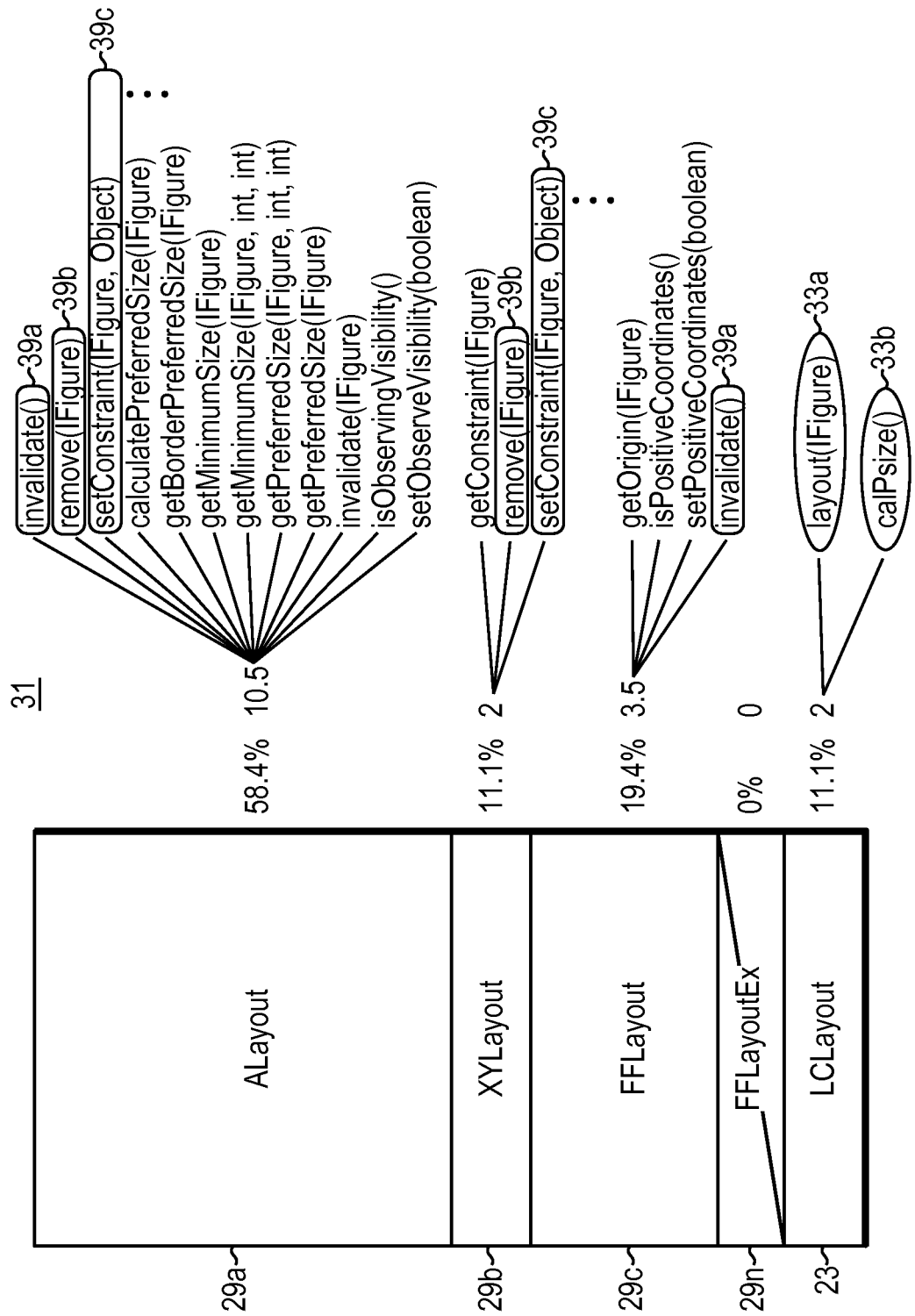
FIGS. 1 and 2 are schematic illustrations of a hierarchal class function diagram (also referred to as functional diagram) in embodiments of the present invention.

With reference now to FIG. 1, shown is a functional diagram 31 for a hierarchy of object oriented programming classes 23, 29 in an embodiment 100 of the present invention. The example functional diagram 31 shows all the functionality contributions (by function 39 name) from each ancestor class 29 in the hierarchy with respect to given class LCLayout 23. The names of functions 33a, b outlined or bordered by ellipses are those that are overridden in given class 23, and those functions 39a, b . . . f whose names are in rectangular outlines (borders) are the ones that are contributed from ancestor classes 29. Other indications, geometric markings, color schemes, symbols, visual techniques for distinguishing overridden functions and contributing functions 33, 39 are suitable.

If a function 39 is contributed in n different classes 29 of the hierarchy, diagramming engine 21 indicates the functional contribution by each of those classes 29 is 1/n. For example, function "invalidate( )" 39a is contributed by class FFLayout 29c as well as by ALayout class 29a. Thus, two classes 29a and 29c contribute the invalidate( )) function 39a, and each of ALayout class 29a and FFLayout class 29c is credited with a contribution value of one half (0.5) for the invalidate( ) function 39a. The contributions based on lines of code or complexity of code can not be calculated and the complexity and length of code is not considered in embodiments of the present invention.

Diagramming engine 21 also calculates a number count of functions contributed per ancestor class 29 and indicates the same in functional diagram 31. For example, FFLayout class 29c uniquely contributes three functions (namely, getOrigin (IFigure), isPositiveCoordinates( ) and setPositiveCoordinates( ) and is credited 0.5 for its common contribution of the invalidate( ) function 39a as discussed previously. Thus, the total number count of functions contributed by class 29c FFLayout is 3.5 (=3+0.5) which diagramming engine 21 indicates in the middle column of functional diagram 31 for example.

Likewise, diagramming engine 21 calculates and indicates in functional diagram 31, the number count of functions contributed by each of ancestor class 29a, b . . . n. In the example, ancestor class 29a ALayout contributes 10.5 functions, i.e., one count for each of:

calculatePreferredSize (IFigure),
    getBorderPreferredSize (IFigure),
    getMinimumSize (IFigure),
    getMinimumSize (IFigure, int, int),
    getPreferredSize (IFigure, int, int),
    getPreferredSize (IFigure),
    invalidate(IFigure),
    isObservingVisability( ), and
    setObserveVisability(boolean)

and 0.5 credit value for each of invalidate( ), remove(IFigure) and setConstraint(IFigure, Object) functions 39a, b, c which are each contributed in common by one respective other class 29b and 29c. So class 29a function contributions total (9×1)+(3×0.5)=10.5 credits.

XYLayout class 29b contributes a total equivalent of 2 functions, i.e., one uniquely, namely getConstraint(IFigure), plus 0.5 credit for remove(IFigure) function 39b plus 0.5 credit for setConstraint(IFigure, Object) function 39c (so 1+0.5+0.5=2). Functions 39b and 39c contributed in common with class ALayout 29a, and thus diagramming engine 21 credits 0.5 for each of functions 39b and 39c to class XYLayout 29b here.

FFLayout class 29c contributes a total equivalent of 3.5 functions. That is, one credit each is given for functions getOrigin (IFigure), isPositiveCoordinates( ), and setPositiveCoordinates(boolean). A 0.5 credit is given for function 39a invalidate ( ) which is contributed in common with class ALayout 29a.

FFLayoutEx class 29n contributes 0 functions. Thus, diagram engine 21 indicates total number count of 0 and 0% for this class 29n in functional diagram 31.

Subject LCLayout class 23 contributes a total number count of 2 functions 33a, b (Layout(IFigure) and calPsize( ). Diagramming engine 21 indicates the total number count of 2 in functional diagram 31 for subject class 23.

Diagramming engine 21 also represents (indicates) the relative percentage contribution in functional diagram 31. To accomplish this, for each class 23, 29 in the hierarchy, diagramming engine 21 calculates the ratio of the number count (total equivalent number) of functions contributed by the class (discussed above) relative to the total number of functions 33, 39 in the diagram 31 (i.e., throughout the hierarchy). The total number of functions 33, 39 in the example functional diagram 31 is 10.5+2+3.5+0+2=18. Class 29a ALayout's relative percentage functionality contribution is 10.5/18=58.4%. Class 29b XYLayout's relative percentage functionality contribution is 2/18=11.1%. FFLayout class 29c's relative percentage functionality contribution is 3.5/18=19.4%. Subject class 23 LCLayout's relative percent functionality contribution is 2/18=11.1%.

It is noted in one embodiment, the diagramming engine 21 illustrates classes 23, 29 with relative sizes (height or area or other dimension) in the diagram 31 (and 41 discussed later) according to percent contribution. So class ALayout 29a is shown to cover a much larger area (portion) of diagram 31 than that of LCLayout class 23 where class 29a contributes at 58.4% and class 23 contributes functions at 11.1%. Likewise, class 29b XYLayout is illustrated in diagram 31 to cover the same amount of area (band height/dimensions) as class 23 LCLayout where the two both contribute functions at 11.1% each. This provides a visual (or graphical) illustration of relative contribution (of functions in diagram 31 and variables in diagram 41) across the classes 23, 29 throughout the hierarchy.

Diagramming engine 21 displays the name of a depicted function 33, 39 in an ellipse or rectangle border in the functional diagram 31 to distinguish between those functions that are overridden and those functions that are being contributed, respectively, as discussed above. The diagram interface 19 (FIG. 4) supports user interaction with the displayed names of functions 33, 39 using known technology. That is functional diagram 31 employs hypertext code or the like and enables or allows a user to click on or otherwise select displayed function names 33, 39. In response, diagram interface 19 displays an indication of the contributing classes 23, 29 of the user-selected function. FIG. 2 is illustrative. In FIG. 2, for a subject (user-selected) function 33, 39, the diagramming engine 21 determines the classes 23, 29 that contribute the subject function. This is accomplished by looking through the various class definitions as held in pertinent data structures (i.e., programming objects). Diagramming engine 21 provides to diagram interface 19 the names of the classes 23, 29 that contribute the subject function. In turn, diagram interface 19 depicts in functional diagram 31 the names of the contributing classes by showing a set of links 27a, b.

In the case of a user selecting an overridden function 33b, FIG. 2 illustrates the diagramming engine 21 and the diagram interface 19 depicting in functional diagram 31 the set of links 27b to classes 23, 29 that contribute to the override of the subject function 33b. Corresponding or linked class 29n is further shown with a cross-out indication in the hierarchy indicating that none of its functions contribute to the subject class 23 LCLayout.

FIG. 3 shows an example variable composition diagram 41 of an embodiment of the present invention. Diagramming engine 21 (as in functional diagram 31) computes and indicates in variable composition diagram 41 the respective total number of variables 49a . . . n (49 generally) contributed by each class 23, 29 in the hierarchy and the percent contribution in the aggregate (overall). Diagramming engine 21 employs counters and the object data structure to accomplish these calculations. By this kind of depiction embodiments visually (illustratively) give a good understanding of large hierarchical designs in real time commercial software.

Of note that immediately catches the eye is that class 29n FFLayoutEx does not contribute to functionality or variable composition (though it may have methods overridden in the subject class LCLayout 23). That means for all practical purposes, LCLayout 23 could have inherited from FFLayoutEx. This may or may not be a bad design. That depends on the context.

Diagramming engine 21 does not show in functional diagram 31 or variable composition diagram 41 the private variables and functions because from the context an object of subject class 23 LCLayout they are not accessible. An option can be used to show such private variables and functions in alternative embodiments. Protected, package and public functions 39 or variables 49 may have different colors. Static methods or variables (39, 40) may have an additional icon, symbol, or other visual means to distinguish them. In case of multiple inheritance, the ancestor classes 29 at the same level may be clubbed together by a box (for example) to indicate the same. Each function 39 contributed may have an icon/symbol (visual indication) if it is a part of an interface implementation.

Accordingly, embodiments identify contribution made by one or more classes in the object oriented program (for example a current class and ancestor classes) in the context of the hierarchy by creating a hierarchical functional diagram 31 and a variable composition diagram 41 for each class. The diagrams provide diagrammatic depiction of methods (functions) overridden and/or contributed in the hierarchy. And the diagrams provide visual indications distinguishing functions which are unique, overridden or which have contributions in different classes in the hierarchy. These functions are marked differently in the diagrams to graphically distinguish them in the diagrams. The percentage contribution of each class (by method/function and by variable) is calculated for the hierarchy and displayed in the diagrams 31, 41. In distinction over state of the art, embodiments of the present invention are not trying to show code of methods and properties of an inherited class but rather a depiction of inheritance contributions and overrides in the context of the class hierarchy (current class and ancestor classes).

The functional diagram 31 and variable composition diagram 41 can be extended in other embodiments for other scenarios as in the preview of one of ordinary skill in the art given this disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
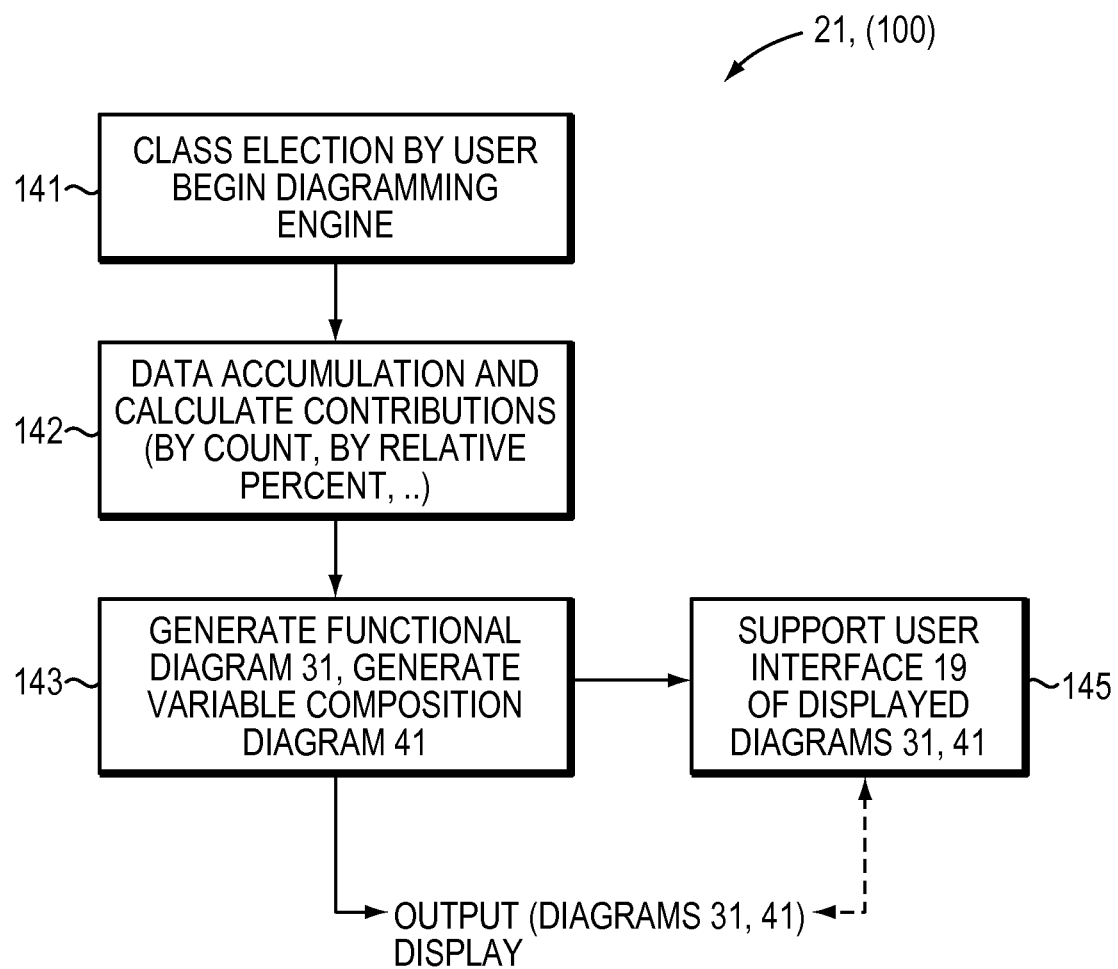
FIG. 4 is a flow diagram of a diagramming engine and a diagram interface in one embodiment of the present invention.

Referring now to FIG. 4, a flow diagram of diagramming engine 21 in a software engineering system 100 is shown for one embodiment to the present invention. The software engineering system 100 enables users to design (i.e., compose, edit, revise and/or otherwise modify) object-oriented computer programs and programming objects. Using common computer programming visual modeling technology and data structures, system 100 displays to an end user user-interactive program modeling diagrams depicting structure and architecture of objects (object-oriented programming objects), corresponding class(es), class definitions, and so forth for designing a subject software program.

Upon user election of a class or otherwise activating a command for class inheritance information, diagramming engine 21 responds and begins at step 141. In particular, based on the user elected class, diagramming engine 21 obtains and accumulates pertinent inheritance data (classes, class hierarchy, functions, variables) from programming model data structures at step 142. Next, at step 142, the diagramming engine 21 identifies the contributions made by the one or more affected classes and calculates number of functions 33,39 being contributed per ancestor class 29 and subject class 23 as detailed previously. Diagramming engine 21 (step 142) also calculates the relative percentage contribution as described above. Also step 142/diagramming engine 21 determines variables per contributing class 23, 29 and calculates respective contribution values and relative percentages as described above in FIG. 3.

Next, in step 143, diagramming engine 21 prepares the functional diagram 31 and the variable composition diagram 41 as illustrated in FIGS. 1 and 3 and discussed above. Common techniques for user-interactive display of diagrams 31, 41 are utilized. Diagramming engine 21 includes in diagrams 31, 41 the calculated number of functions, number of variables and relative percentages as well as ellipse borders around names of overridden functions 33 and rectangular borders around names of contributing functions 39, or other visual indications per class 23, 29 in the hierarchy. Diagramming engine 21 fashions diagrams 31, 41 to convey class inheritance information and impact in a visual manner (illustrative depiction). Step 143 outputs diagrams 31, 41 for display to the end user.

Diagramming engine 21 also launches or co-supports diagram interface 19 at step 145 during display of diagrams 31, 41. Diagram interface 19 generally employs common user interface and GUI (Graphical User Interface) technology. In addition, as the user interacts with the displayed diagrams 31, 41, diagram interface 19 (step 145) responds according to the principles of the present invention such as by displaying corresponding lists 27 of classes contributing to a user selected function 39 as described in FIG. 2 and provided by diagramming engine 21.

Figure 5:
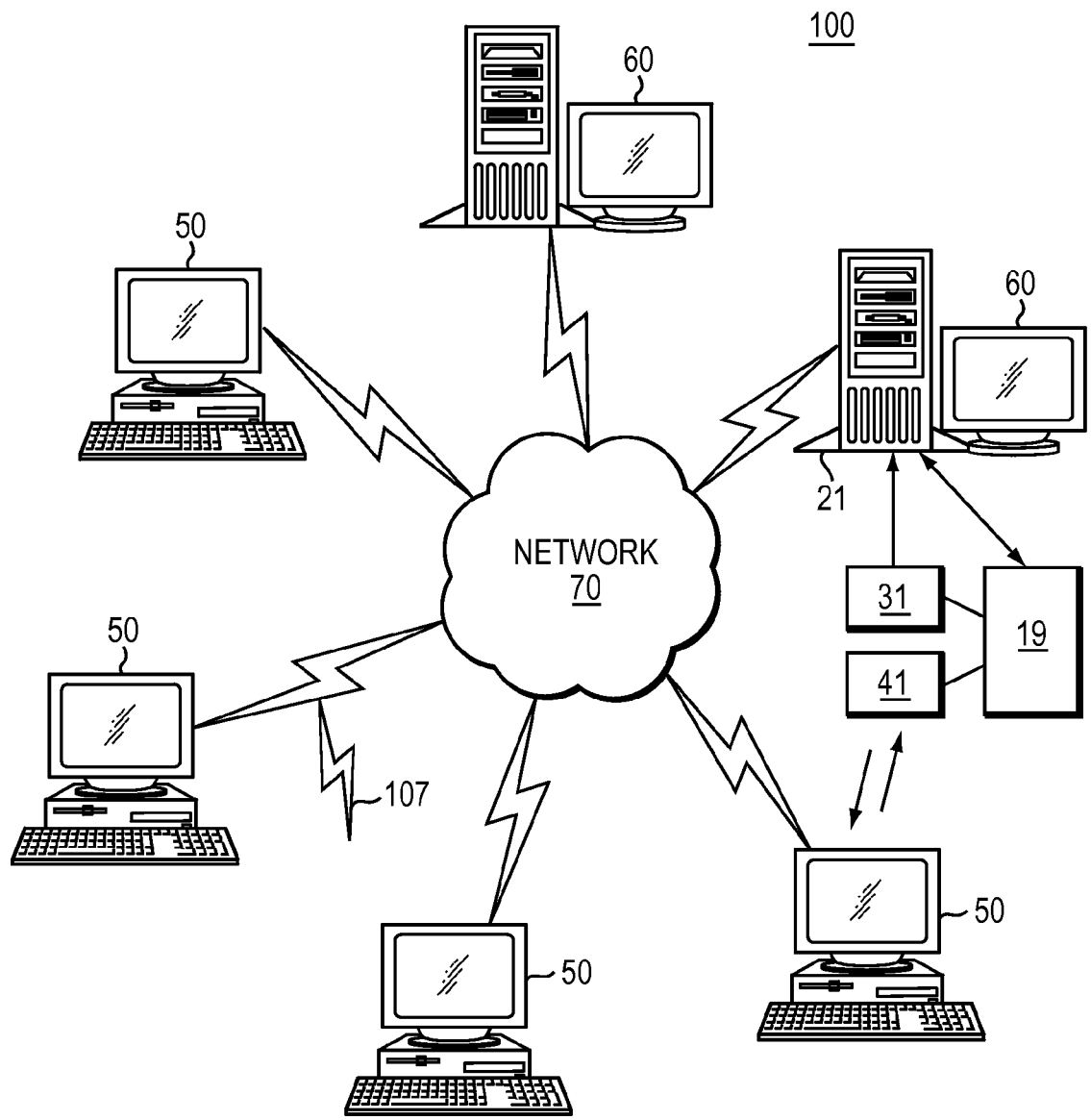
FIG. 5 is a schematic view of a computer network in which embodiments of the present invention are deployed.

FIG. 5 illustrates a computer network or similar digital process environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
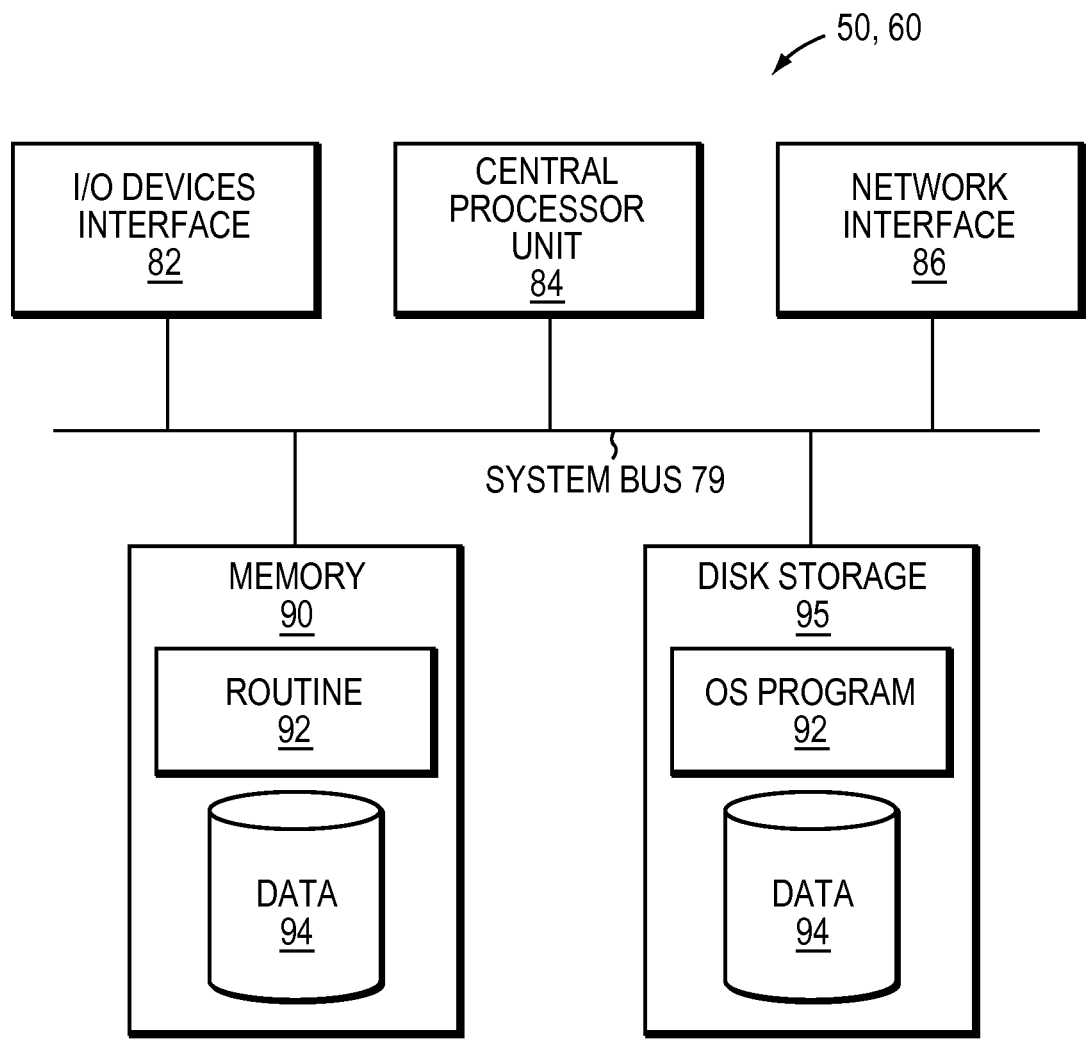
FIG. 6 is a block diagram of a computer node and the computer network of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., diagramming engine 21, diagram interface 19 and supporting code detailed above). Disk storage 95 provides non-volatile storage for computer software instructions 92 and data 94 used to implement an embodiment of the present invention.

Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The terminology used herein was chosen to best explain the principles of the embodiments, the practical application or technical improvement over technologies found in the marketplace, or to enable others of ordinary skill in the art to understand the embodiments disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A computer based method of designing software comprising:
   in a digital processor:
      receiving user selection of a programming object of a program model displayable in a screen view of a software engineering system;
      determining corresponding class of the user selected programming object and determining a class hierarchy, the class hierarchy including the corresponding class and any ancestor classes, wherein the corresponding class and each ancestor class is formed of respective functions and variables;
      generating a diagram depicting the functions as contributed by respective ones of the corresponding class and ancestor classes, such that the diagram illustrates class inheritance of the user selected programming object by depicting which classes in the hierarchy contribute which functions, the generated diagram including quantitative indications of function-wise contribution made by each class and including different visual indications distinguishing functions which are unique, overridden and contributing in different classes of the hierarchy, wherein the quantitative indications include a number count of functions contributed by a class based upon, at least in part, a number of uniquely contributed functions by the class and a number of commonly contributed functions by the class, wherein the quantitative indications include a relative percent of total function contribution of the corresponding class and each ancestor class that is relative to the total number of functions in the generated diagram throughout the class hierarchy; and
      displaying the generated diagram with the relative percent of total function contribution of the corresponding class and each ancestor class that is relative to the total number of functions in the generated diagram throughout the class hierarchy to a user on output.

2. A method as claimed in claim 1 further comprising generating a variable composition diagram depicting the variables as contributed by respective ones of the corresponding class and ancestor classes.

3. A method as claimed in claim 2 wherein the variable composition diagram includes quantitative indications of variable-wise contributions made by each class.

4. A method as claimed in claim 3 wherein the quantitative indications include a number count of variables contributed by a class.

5. A method as claimed in claim 3 wherein the quantitative indications include a relative percentage of total variable contribution.

6. A method as claimed in claim 1 further comprising:
   enabling user interaction with the depicted functions in the displayed diagram; and
   responsively rendering an indication of all classes that contribute that function.

7. A method as claimed in claim 1:
   wherein the different visual indications of the generated diagram visually distinguish between overridden functions and newly added functions.

8. A method as claimed in claim 7 wherein the different visual indications of over ridden or newly added functions include geometric borders, color schemes or other distinguishing visual effects.

9. A computer system of designing software, comprising:
   a processor executing a diagramming engine, the diagramming engine:
      (a) receiving user election of a programming object of a program model displayable in a screen view of a software engineering system;
      (b) determining corresponding class of the user elected programming object and determining a class hierarchy, the class hierarchy including the corresponding class and any ancestor classes, wherein the corresponding class and each ancestor class is formed of respective functions and variables; and
      (c) generating and outputting display of a diagram depicting the functions as contributed by respective ones of the corresponding class and ancestor classes, such that the diagram illustrates class inheritance of the user elected programming object by depicting which classes in the hierarchy contribute which functions, the generated and displayed diagram including quantitative indications of function-wise contribution made by each class and including different visual indications distinguishing functions which are unique, overridden and contributing in different classes of the hierarchy, wherein the quantitative indications include a number count of functions contributed by a class based upon, at least in part, a number of uniquely contributed functions by the class and a number of commonly contributed functions by the class, wherein the quantitative indications include a relative percent of total function contribution of the corresponding class and each ancestor class that is relative to the total number of functions in the generated diagram throughout the class hierarchy; and
   a display output device displaying a diagram interface coupled to the diagram as displayed to a user on output, the diagram interface enabling user interaction with the depicted functions in the displayed diagram, and responsively rendering indication of all classes that contribute that function with the relative percent of total function contribution of the corresponding class and each ancestor class that is relative to the total number of functions in the generated diagram throughout the class hierarchy to a user on output.

10. A computer system as claimed in claim 9 wherein the diagramming engine further generates and displays a variable composition diagram depicting the variables as contributed by respective ones of the corresponding class and ancestor classes.

11. A computer system as claimed in claim 10 wherein the variable composition diagram includes quantitative indications of variable-wise contributions made by each class.

12. A computer system as claimed in claim 11 wherein the quantitative indications include a number count of variables contributed by a class.

13. A computer system as claimed in claim 11 wherein the quantitative indications include a relative percentage of total variable contribution.

14. A computer system as claimed in claim 9:
wherein the different visual indications in the diagram visually distinguish between overridden functions and newly added functions.

15. A computer system as claimed in claim 14 wherein the different visual indications of overridden or newly added functions include geometric borders, color schemes or other distinguishing visual effects.

16. A computer program product for designing software comprising:
a non-transitory computer readable storage medium having computer readable program code embodied therewith, the computer readable program code comprising:
computer readable program code configured to:
 (a) receive user election of a programming object of a program model displayable in a screen view of a software engineering system;
 (b) determine corresponding class of the user elected programming object and determine a class hierarchy, the class hierarchy including the corresponding class and any ancestor classes, wherein the corresponding class and each ancestor class is formed of respective functions and variables;
 (c) generate and output display of a diagram depicting the functions as contributed by respective ones of the corresponding class and ancestor classes, such that the diagram illustrates class inheritance of the user elected programming object by depicting which classes in the hierarchy contribute which functions, the generated and displayed diagram including quantitative indications of function-wise contribution made by each class and including different visual indications distinguishing functions which are unique, overridden and contribute in different classes of the hierarchy, wherein the quantitative indications include a number count of functions contributed by a class based upon, at least in part, a number of uniquely contributed functions by the class and a number of commonly contributed functions by the class, wherein the quantitative indications include a relative percent of total function contribution of the corresponding class and each ancestor class that is relative to the total number of functions in the generated diagram throughout the class hierarchy; and
 (d) enable user interaction with the depicted functions in the displayed diagram, and responsively render indication of all classes that contribute that function with the relative percent of total function contribution of the corresponding class and each ancestor class that is relative to the total number of functions in the generated diagram throughout the class hierarchy to a user on output.

\* \* \* \* \*